(12) United States Patent
Tanno (10) Patent No.: US 10,500,910 B2
(45) Date of Patent: Dec. 10, 2019

(54) PNEUMATIC TIRE

(71) Applicant: The Yokohama Rubber Co., LTD., Minato-ku, Tokyo (JP)

(72) Inventor: Atsushi Tanno, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 411 days.

(21) Appl. No.: 15/519,814

(22) PCT Filed: Oct. 9, 2015

(86) PCT No.: PCT/JP2015/078795
§ 371 (c)(1),
(2) Date: Apr. 17, 2017

(87) PCT Pub. No.: WO2016/060085
PCT Pub. Date: Apr. 21, 2016

(65) Prior Publication Data
US 2017/0246923 A1 Aug. 31, 2017

(30) Foreign Application Priority Data
Oct. 17, 2014 (JP) .................. 2014-212297

(51) Int. Cl.
*B60C 19/00* (2006.01)
*B60C 23/00* (2006.01)
*B60C 23/04* (2006.01)
*B29D 30/00* (2006.01)

(52) U.S. Cl.
CPC .......... *B60C 23/0493* (2013.01); *B60C 19/00* (2013.01); *B29D 2030/0072* (2013.01)

(58) Field of Classification Search
CPC ..... B60C 19/00; B60C 19/002; B60C 19/003; B60C 2019/004; B60C 23/00; B60C 23/0493
See application file for complete search history.

(56) References Cited

U.S. PATENT DOCUMENTS

| | | |
|---|---|---|
| 2003/0155054 A1 | 8/2003 | Bell |
| 2006/0260726 A1 | 11/2006 | Bell |
| 2010/0108222 A1 | 5/2010 | Bell |
| 2011/0113630 A1 | 5/2011 | Bell |

(Continued)

FOREIGN PATENT DOCUMENTS

| | | |
|---|---|---|
| CN | 102310732 | 1/2012 |
| JP | 2002-012002 | 1/2002 |

(Continued)

OTHER PUBLICATIONS

International Search Report for International Application No. PCT/JP2015/078795 dated Dec. 22, 2015, 4 pages, Japan.

*Primary Examiner* — Justin R Fischer
(74) *Attorney, Agent, or Firm* — Thorpe North & Western (57) ABSTRACT

Provided is a pneumatic tire including one fastener in a separable pair of mechanical fasteners, the one fastener being disposed on the tire inner surface. The one fastener includes at least two components. The at least two components are fixed together while sandwiching the fixing member made from a resin or a resin composition composed of a blend of a resin and an elastomer. The fixing member includes anchoring elements disposed only on the side facing the tire inner surface. The anchoring elements are at least partially embedded in the tire inner surface.

12 Claims, 6 Drawing Sheets

(56) References Cited

U.S. PATENT DOCUMENTS

2012/0000588 A1   1/2012  Tanno et al.
2012/0024439 A1   2/2012  Tanno et al.

FOREIGN PATENT DOCUMENTS

| | | |
|---|---|---|
| JP | 2005-517581 | 6/2005 |
| JP | 2005-179851 | 7/2005 |
| JP | 2006-044503 | 2/2006 |
| JP | 2012-025318 | 2/2012 |
| JP | 2012-240465 | 12/2012 |
| WO | WO 2003/070496 | 8/2003 |

PNEUMATIC TIRE

TECHNICAL FIELD

The present technology relates to a pneumatic tire, and particularly relates to a pneumatic tire capable of retaining an object secured on an inner surface of the pneumatic tire.

BACKGROUND ART

In recent years, research and development in how to dispose an object having various specific functions on an inner surface of a pneumatic tire have been performed.

For example, attaching methods have been proposed in which a tire tag (radio frequency identification tag), a chip, a sound absorbing member, or the like is attached to an inner liner or the like of a green tire using a so-called surface fastener, such as a hook and loop fastener or a hook and hook fastener (Japanese Unexamined Patent Application Publication Nos. 2005-517581A and 2006-44503A).

The surface fasteners proposed in Japanese Unexamined Patent Application Publication Nos. 2005-517581A and 2006-44503A are preferred in that the surface fasteners exhibit relatively strong engagement force when attached and achieve engagement on a surface regardless of slight misalignments during the attaching operation. However, when subjected to high speed rolling motion at relatively high temperatures, the tire inner surface deforms and compacts repeatedly over an extended period of time at high speeds, resulting in partial physical deterioration in the surface fastener. As this deterioration progresses, the engagement force of an entirety of the surface fastener deteriorates/declines over time. This leads to difficulties in retaining a desired engagement force over an extended period of time.

The present inventor et al. proposed pneumatic tires each having one fastener in a separable pair of mechanical fasteners, on a tire inner surface (Japanese Unexamined Patent Application Publication Nos. 2012-25318A and 2012-240465A). These pneumatic tires are essentially free of the aforementioned problems and in particular, the obtained engagement force is great and is essentially free of variations (positional variation within the tire and variation from tire to tire). Furthermore, the engagement force deteriorates/declines minimally over time even under extreme usage conditions including repetitive deformation and compaction of the tire inner surface caused by high speed tire rolling motion at relatively high temperatures over an extended period of time, and the desired engagement force can be retained over an extended period of time.

Approaches using this mechanical fastener are superior from the perspectives of the obtained engagement force, variations in the engagement force, reliability in the engagement operation, and the like. As a method for attaching the one fastener to the tire inner surface, the present inventor et al. proposed individually embedding the fasteners in a tread rubber and vulcanizing the tire, and disposing the one mechanical fastener in the separable pair of mechanical fasteners on the tire inner surface. The one mechanical fastener is composed of at least two fastener components that are fixed together while sandwiching a rubber layer being a tire component, or a rubber-coated fiber reinforced member to dispose the one mechanical fastener (Japanese Unexamined Patent Application Publication No. 2012-25318A).

The present inventor et al. also proposed disposing the one fastener in the pair of mechanical fasteners on the tire inner surface by fixing the at least two fastener components together while sandwiching a woven fabric or nonwoven fabric made of fibers (Japanese Unexamined Patent Application Publication No. 2012-240465A).

However, with these methods, the desired attachment strength may not be obtained depending on the shape and attaching position of the mechanical fastener, and accordingly, the durability and long lifetime of the pneumatic tire provided with an object having a specific function may not be achieved as desired.

The mechanical fastener is required to have a greater attachment strength and a longer lifetime to be suitable for characteristics (weight, size, shape, and the like) unique to the object having a specific function and disposed in the tire.

SUMMARY

The present technology provides a pneumatic tire including a mechanical fastener disposed in the tire, the mechanical fastener exhibiting great engagement force that is essentially free of variations (positional variation within the tire and variation from tire to tire) and deteriorates/declines minimally over time even under extreme usage conditions including repetitive deformation and compaction of the tire inner surface caused by high speed tire rolling motion at relatively high temperatures over an extended period of time; offering great attachment strength to the tire inner surface; and being effective in attaching and retaining, over an extended period of time, a desired functional object having a specific function and unique characteristics (weight, size, shape, and the like).

A pneumatic tire of an embodiment of the present technology has configuration (1) below.

(1) A pneumatic tire includes one fastener in a separable pair of mechanical fasteners, the one fastener being disposed on a tire inner surface. The one fastener includes at least two components. The at least two components are fixed together while sandwiching a fixing member made from a resin or a resin composition composed of a blend of a resin and an elastomer. The fixing member includes anchoring elements disposed only on a side facing the tire inner surface. The anchoring elements are at least partially embedded in the tire inner surface.

Specifically, the pneumatic tire according to the present technology is preferably configured as described in any of (2) to (7) below.

(2) In the pneumatic tire according to (1) above, a side, provided with the anchoring elements, of the fixing member has a surface area within a range of 1.3 to 50 times a surface area of a side not provided with the anchoring elements.

(3) In the pneumatic tire according to (1) or (2) above, an apparent area of the fixing member is 20 to 500 times a projected area of the one fastener.

(4) In the pneumatic tire according to any one of (1) to (3) above, a height (mm) of the anchoring elements, a number (pieces/fastener) of the anchoring elements per fastener, and a mass (g) of an object attached via the one fastener satisfy the following Formula (a):

(Height of anchoring elements×Number of anchoring elements)/Mass of attached object=2 to 75     Formula (a).

(5) In the pneumatic tire according to any one of (1) to (4) above, reinforcing filaments are arranged between the anchoring elements on the side, facing the tire, of the fixing member; and the one fastener is disposed while sandwiching the fixing member and the reinforcing filaments.

(6) In the pneumatic tire according to any one of (1) to (5) above, the fixing member is composed of two types of resin layers or a resin layer laminated on a layer other than a resin layer.

(7) In the pneumatic tire according to any one of (1) to (6) above, corona treatment or plasma treatment is performed on surfaces of the anchoring elements on the side, facing the tire, of the fixing member.

The present technology according to (1) achieves a pneumatic tire including a mechanical fastener that exhibits great engagement force for attaching an object, the engagement force being essentially free of variations (positional variation within the tire and variation from tire to tire) and deteriorating/declining minimally over time even under extreme usage conditions including repetitive deformation and compaction of the tire inner surface caused by high speed tire rolling motion at relatively high temperatures over an extended period of time. Additionally, the mechanical fastener offers great attachment strength to the tire inner surface.

With these effects, the present technology according to (1) thus achieves a pneumatic tire including a superior mechanical fastener disposed in the tire, the mechanical fastener keeping a desired functional object having a specific function and unique characteristics (weight, size, shape, and the like) attached in the tire over an extended period of time and thus keeping the function working, without limiting or restricting the object in terms of certain characteristics.

Especially, the present technology according to any one of (2) to (7) achieves a superior pneumatic tire that can yield the aforementioned effects of the present technology according to (1) to a greater extent and with more reliability.

BRIEF DESCRIPTION OF DRAWINGS

FIGS. 1A and 1B both illustrate one embodiment of a pneumatic tire of the present technology.

DETAILED DESCRIPTION

A detailed explanation of the pneumatic tire of the present technology will be given below.

Figure 1A:
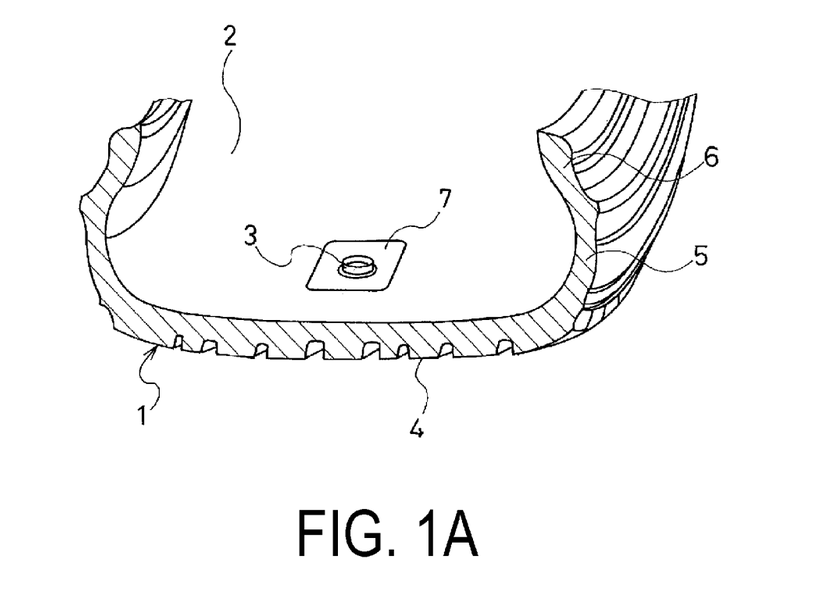
FIG. 1A is a partially fractured cross-sectional perspective view of the embodiment of the pneumatic tire of the present technology.
Figure 1B:
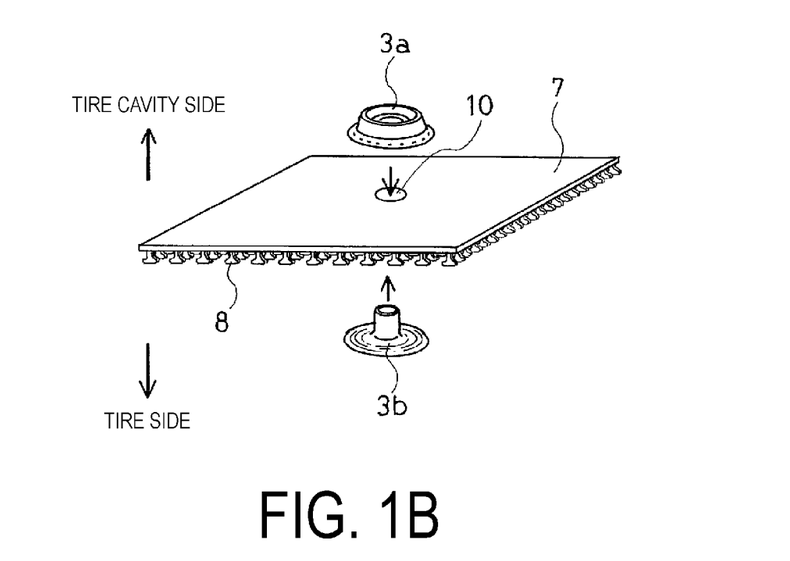
FIG. 1B is an external perspective model view illustrating a state in which two components constituting one mechanical fastener in a separable pair of mechanical fasteners used on the pneumatic tire of the present technology are engaged with each other while sandwiching a fixing member made from a resin or a resin composition composed of a blend of a resin and an elastomer.

With reference to FIGS. 1A, 1B, the pneumatic tire 1 of the present technology includes one fastener 3 in a separable pair of mechanical fasteners, disposed on a tire inner surface 2. The one fastener is composed of at least two components 3*a*, 3*b*. The at least two components 3*a*, 3*b* are fixed together while sandwiching a fixing member 7 made from a resin or a resin composition composed of a blend of a resin and an elastomer. The fixing member 7 includes anchoring elements 8 disposed only on a side facing the tire inner surface 2. The anchoring elements 8 are at least partially embedded in the tire inner surface 2.

In the present technology, the mechanical fasteners are each composed of a pair of fasteners separable into two fasteners 3 and physically re-engageable with each other, and capable of repeatedly freely engaging with and separating from each other, which are basically similar to those in Japanese Unexamined Patent Application Publication Nos. 2012-25318A and 2012-240465A described above. The one mechanical fastener 3 in the separable pair of mechanical fasteners is normally composed of the two components 3*a*, 3*b*. Exemplary types of such a mechanical fastener are those known as "hooks" or "snaps." Specific examples of products in the clothing industry and the like that are generally included as mechanical fasteners are snap buttons, ring snaps, ring hooks, American snaps, American hooks, eyelet hooks, spring hooks, and jumper hooks.

Such mechanical fasteners differ from so-called "surface fasteners" in that while an area of the engaging part of a surface fastener is unlimited in the entire area, the area of the engaging part of a mechanical fastener is small (preferably from approximately 1 to 115 mm$^2$, and more preferably from approximately 4 to 90 mm$^2$, for example). In other words, the mechanical fastener is a point fastener. That is, even when engaged at a small area of from approximately 1 to 115 mm$^2$ for example, strong engaging is achieved due to a mechanical male-female structure or the like. Thus, a conventional structure for the mechanical fastener may be used. The mechanical fastener may be made from a metal, a rubber, a synthetic resin material, or the like.

In the present technology, the fixing member 7 provided with the aforementioned anchoring elements 8 adds force generated by anchor effect from the anchoring elements 8 of the fixing member 7 to the fixing force of the components 3*a*, 3*b* and thus significantly increases the fixing force of the components 3*a*, 3*b* (continuity and magnitude of the fixing force), resulting in an increase in force for fixing the fastener 3.

Each of the anchoring elements 8 may have any shape having a protrusion that can produce anchor effect, and the entire shape and the like are not particularly limited. It is important that the tire includes the anchoring elements (the protrusions) at least partially embedded in the tire inner surface. This embedded form produces anchor effect.

Figure 2A:
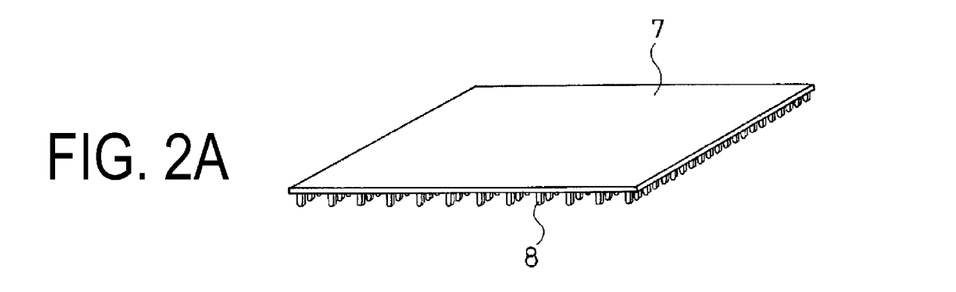
FIGS. 2A to 2D are model diagrams illustrating various example forms of anchoring elements of the fixing member.
Figure 2B:
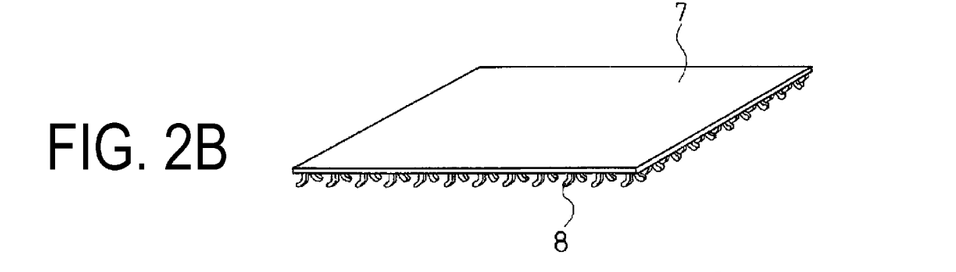
Figure 2C:
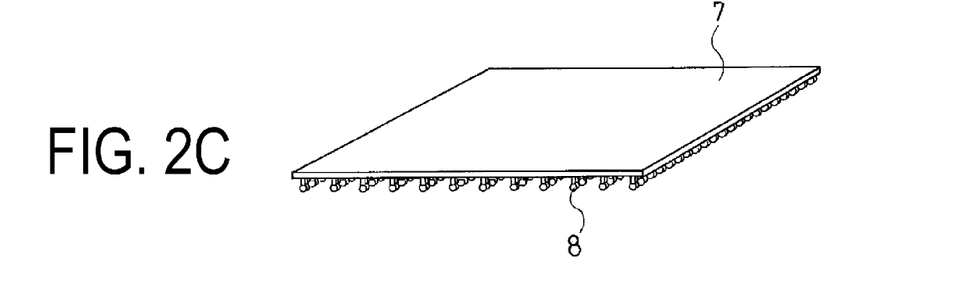

The entire shape of each of the protrusions composing the anchoring elements 8 is not particularly limited as described above, and exemplary entire shapes of the protrusion (anchoring element) include a "T" shape illustrated in FIG. 1B, an "I" shape (FIG. 2A), a "Y" shape, an "r" shape (FIG. 2B), and a shape having a head of the protrusion formed in a spherical shape or a disc shape (FIG. 2C). The fixing member 7 may be any resin sheet or the like that includes protrusions having various shapes and is commercially available as a surface fastener. The protrusions may each have a so-called "barb".

Figure 3A:
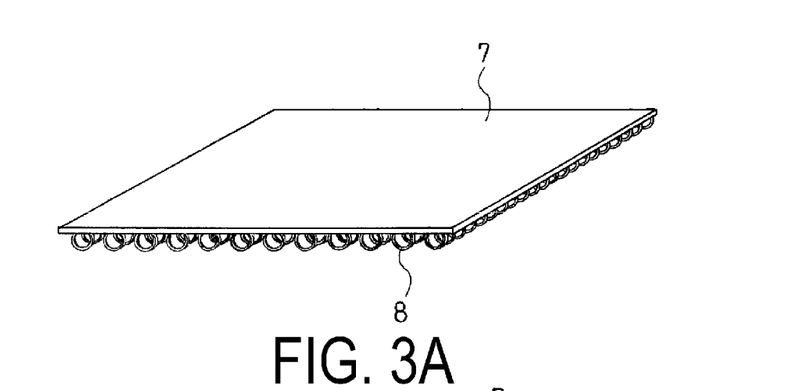
FIGS. 3A, 3B are model diagrams illustrating other example forms of the anchoring element of the fixing member.
Figure 3B:
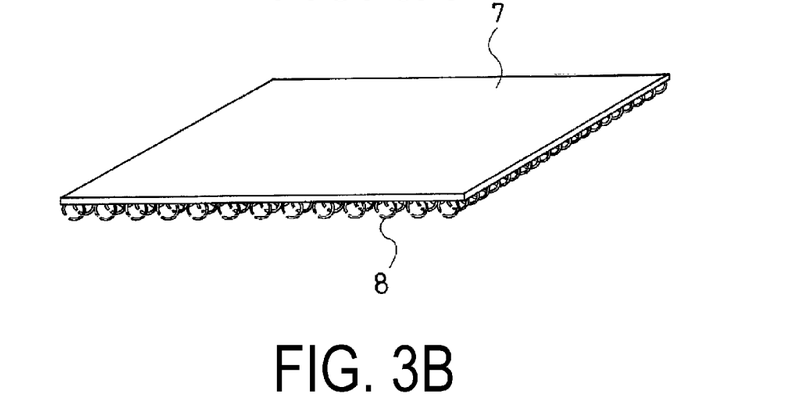

Each of the protrusions composing the anchoring elements 8 may form a loop as illustrated in FIGS. 3A, 3B, and the loop may be of any type, for example, a closed loop illustrated in FIG. 3A and an open loop having one section cut to be open, illustrated in FIG. 3B.

A thermoplastic resin or a thermosetting resin can be used for the fixing member 7; however, a thermoplastic resin is preferred from the perspective of good handleability. The thermoplastic resin will be described in detail later. As the thermosetting resin, an epoxy resin, a phenolic resin, a urea resin, a melamine resin, an unsaturated polyester, a silicone resin, a polyurethane resin, and the like are preferred.

Examples of the thermoplastic resin that can be used for the fixing member 7 include a polyamide resin (e.g., nylon 6 (N6), nylon 66 (N66), nylon 46 (N46), nylon 11 (N11), nylon 12 (N12), nylon 610 (N610), nylon 612 (N612), a nylon 6/66 copolymer (N6/66), a nylon 6/66/610 copolymer (N6/66/610), nylon MXD6 (MXD6), nylon 6T, nylon 9T, a nylon 6/6T copolymer, a nylon 66/PP copolymer, a nylon 66/PPS copolymer) and an N-alkoxyalkyl compound thereof, e.g., a methoxymethyl compound of nylon 6, a methoxymethyl compound of a nylon 6/610 copolymer, or a methoxymethyl compound of nylon 612; a polyester resin (e.g., an aromatic polyester such as polybutylene terephthalate (PBT), polyethylene terephthalate (PET), polyethylene isophthalate (PEI), a PET/PEI copolymer, polyarylate (PAR), polybutylene naphthalate (PBN), a liquid crystal polyester, a polyoxyalkylene diimide acid/polybutylene terephthalate copolymer); a polynitrile resin (e.g., polyacrylonitrile (PAN), polymethacrylonitrile, an acrylonitrile/styrene copolymer (AS), a (meta)acrylonitrile/styrene copolymer, a (meta)acrylonitrile/styrene/butadiene copolymer); a polymethacrylate resin (e.g., polymethyl-methacrylate (PMMA), polyethyl-methacrylic acid); a polyvinyl resin (e.g., polyvinyl acetate, a polyvinyl alcohol (PVA), a vinyl alcohol/ethylene copolymer (EVOH), polyvinylidene chloride (PVDC), polyvinylchloride (PVC), a vinyl chloride/vinylidene chloride copolymer, a vinylidene chloride/methylacrylate copolymer, a vinylidene chloride/acrylonitrile copolymer (ETFE)); a cellulose resin (e.g., cellulose acetate, cellulose acetate butyrate); a fluoride resin (e.g., polyvinylidene difluoride (PVDF), polyvinyl fluoride (PVF), polychlorofluoroethylene (PCTFE), a tetrafluoroethylene/ethylene copolymer); and an imide resin (e.g., an aromatic polyimide (PI)).

In the above examples, a polyester resin, a polyamide resin, or a polypropylene resin is preferred from the perspectives of physical properties, workability, handleability, and the like.

Further, for the resin and the elastomer that constitute the blend (resin composition) that can be used to constitute the fixing member 7, the above may be used as the thermoplastic resin. Preferable examples of the elastomer constituting the blend (resin composition) include a diene-based rubber or a hydrogenate thereof (e.g., a natural rubber (NR), an isoprene rubber (IR), an epoxidized natural rubber, a styrene butadiene rubber (SBR), a butadiene rubber (BR, high cis-BR, and low cis-BR), a nitrile rubber (NBR), hydrogenated NBR, hydrogenated SBR), an olefin rubber (e.g., an ethylene propylene rubber (EPDM, EPM), a maleic acid modified ethylene propylene rubber (M-EPM), a butyl rubber (IIR), an isobutylene and aromatic vinyl or diene-based monomer copolymer, an acrylic rubber (ACM), an ionomer), a halogen-containing rubber (e.g., Br-IIR, CI-IIR, a brominated isobutylene-p-methylstyrene copolymer (BIMS), a chloroprene rubber (CR), a hydrin rubber (CHR), a chlorosulfonated polyethylene rubber (CSM), a chlorinated polyethylene rubber (CM), a chlorinated polyethylene rubber modified with maleic acid (M-CM)), a silicone rubber (e.g., a methyl vinyl silicone rubber, a dimethyl silicone rubber, a methylphenyl vinyl silicone rubber), a sulfur-containing rubber (e.g., a polysulfide rubber), a fluororubber (e.g., a vinylidene fluoride rubber, a vinyl ether rubber containing fluoride, a tetrafluoroethylene-propylene rubber, a silicon-based rubber containing fluoride, a phosphazene rubber containing fluoride), and a thermoplastic elastomer (e.g., a styrene elastomer, an olefin elastomer, an ester elastomer, a urethane elastomer, a polyamide elastomer).

In particular, it is preferable for at least 50 wt. % of the elastomer to be a halogenated butyl rubber, a brominated isobutylene-paramethyl-styrene copolymer rubber, or a maleic anhydride-modified ethylene a olefin copolymer rubber from the perspective of being able to increase the rubber volume ratio so as to soften and enhance the durability of the elastomer at both low and high temperatures.

In addition, it is preferable for at least 50 wt. % of the thermoplastic resin in the blend to be any one of nylon 11, nylon 12, nylon 6, nylon 66, a nylon 6/66 copolymer, a nylon 6/12 copolymer, a nylon 6/10 copolymer, a nylon 4/6 copolymer, a nylon 6/66/12 copolymer, aromatic nylon, or an ethylene/vinyl alcohol copolymer from the perspective of being able to achieve superior durability.

Moreover, when the compatibility is different upon obtaining a blend by blending a combination of the previously specified thermoplastic resin and the previously specified elastomer, a suitable compatibility agent may be used as a third component to enable compatibilization of both the resin and the elastomer. By mixing the compatibility agent in the blend, interfacial tension between the thermoplastic resin and the elastomer is reduced, and as a result, the particle diameter of the elastomer that forms the dispersion phase becomes very small and thus the characteristics of both components may be realized effectively. In general, such a compatibility agent has a copolymer structure of both or either one of the thermoplastic resin and the elastomer, or a copolymer structure having an epoxy group, a carbonyl group, a halogen group, an amino group, an oxazoline group, or a hydroxyl group, which is capable of reacting with the thermoplastic resin or the elastomer. While the type of compatibility agent may be selected according to the type of thermoplastic resin and elastomer to be blended, such a compatibility agent generally includes: a styrene/ethylene butylene block copolymer (SEBS) or a maleic acid modified compound thereof; an EPDM, EPM, EPDM/styrene or EPDM/acrylonitrile graft copolymer or a maleic acid modified compound thereof; a styrene/maleic acid copolymer, or a reactive phenoxy, and the like. The blending proportion of such a compatibility agent is not particularly limited, but may preferably be 0.5 to 10 parts by weight relative to 100 parts by weight of the polymer components (the total amount of the thermoplastic resin and the elastomer).

A composition ratio of the specified thermoplastic resin and the elastomer in the blend obtained by blending a thermoplastic resin with an elastomer is not particularly limited and may be determined as appropriate to establish a dispersed structure as a discontinuous phase of the elastomer in the matrix of the thermoplastic resin, and is preferably within a range of a weight ratio of from 90/10 to 30/70.

In the present technology, a compatibility agent or other polymers may be blended with the thermoplastic resin or the blend of a thermoplastic resin blended with an elastomer, within a range that does not harm the characteristics required for constituting the fixing member 7, for example. The purposes of mixing such a polymer are to improve the compatibility between the thermoplastic resin and the elastomer, to improve the molding workability of the material, to improve the heat resistance, to reduce cost, and the like. Examples of the material used for the polymer include polyethylene (PE), polypropylene (PP), polystyrene (PS), acrylonitrile butadiene styrene (ABS), polystyrene-butadiene-styrene (SBS), and polycarbonate (PC).

Furthermore, a reinforcing agent such as a filler (calcium carbonate, titanium oxide, alumina, and the like), carbon black, or white carbon, a softening agent, a plasticizer, a processing aid, a pigment, a dye, or an anti-aging agent that are generally compounded with polymer compounds may be optionally compounded so long as the required characteristics as the fixing member 7 are not impaired. The blend of a thermoplastic resin and an elastomer has a structure in which the elastomer is distributed as a discontinuous phase in the matrix of the thermoplastic resin. This structure provides molding workability equivalent to that of the thermoplastic resin.

Furthermore, the elastomer to be blended with the thermoplastic resin can be dynamically vulcanized when being mixed with the thermoplastic resin. A vulcanizer, a vulcanization aid, vulcanization conditions (temperature, time), and the like, during the dynamic vulcanization can be determined as appropriate in accordance with the composition of the elastomer to be added, and are not particularly limited.

When the elastomer in the thermoplastic resin composition is dynamically vulcanized in this manner, the obtained fixing member contains a vulcanized elastomer. Therefore, the fixing member has resistance (elasticity) against deformation from the outside, which is preferable in that the effect of the present technology can be enhanced.

Generally available rubber vulcanizers (crosslinking agents) can be used as the vulcanizer. Specifically, examples of a sulfur-based vulcanizer include powdered sulfur, precipitated sulfur, highly dispersible sulfur, surface treated sulfur, insoluble sulfur, dimorpholine disulfide, alkylphenol disulfide, and the like. Such a sulfur-based vulcanizer can be used in an amount of, for example, from approximately 0.5 to 4 phr (in the present specification, "phr" refers to parts by weight per 100 parts per weight of an elastomer component, hereinafter the same).

Moreover, examples of an organic peroxide-based vulcanizer include benzoyl peroxide, t-butyl hydroperoxide, 2,4-dichlorobenzoyl peroxide, 2,5-dimethyl-2,5-di(t-butyl peroxy)hexane, 2,5-dimethylhexane-2,5-di(peroxyl benzoate), and the like. Such an organic peroxide-based vulcanizer can be used in an amount of, for example, from around 1 to 20 phr.

Furthermore, examples of a phenol resin-based vulcanizer include brominated alkylphenol resins and mixed crosslinking system containing an alkyl phenol resin with a halogen donor such as tin chloride and chloroprene. Such a phenol resin-based vulcanizer can be used in an amount of, for example, from around 1 to 20 phr.

Examples of other vulcanizers include zinc oxide (approximately 5 phr), magnesium oxide (approximately 4 phr), litharge (from approximately 10 to 20 phr), p-quinone dioxime, p-dibenzoylquinone dioxime, tetrachloro-p-benzoquinone, poly-p-dinitrosobenzene (from approximately 2 to 10 phr), and methylenedianiline (from approximately 0.2 to 10 phr).

As necessary, a vulcanization accelerator may be added. As the vulcanization accelerator, from approximately 0.5 to 2 phr, for example, of a generally available vulcanization accelerator of an aldehyde-ammonia base, a guanidine base, a thiazole base, a sulfenamide base, a thiuram base, a dithio acid salt base, a thiourea base, or the like can be used.

That is, the entire shape and entire structure of the fixing member 7 may be formed by a molding obtained by integrally molding the base section and the anchoring element section with a resin or a resin composition composed of the blend of a resin and an elastomer by an appropriate molding method, or may be formed by using a woven fabric, a knitted fabric, or a nonwoven fabric as the base section and a large number of protruding loops made of fibers or filaments as the anchoring element section. Thus, the base section may be a molding shaped into a film or the like, or a fiber structure, such as a woven fabric and a knitted fabric, and the anchoring element may be composed of a molding, filaments, or the like.

Figure 2D:
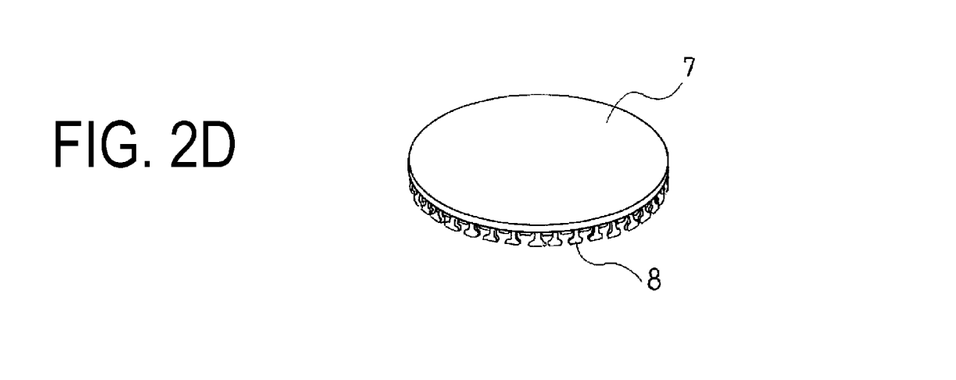

The profile shape of the fixing member 7 can be appropriately selected, for example, a square or a rectangle illustrated in FIGS. 2A to 2C, a circle or an oval illustrated in FIG. 2D, or a regular polygon not illustrated in the drawings. The fixing member 7 is provided with a through hole 10 for receiving the shaft of the components 3a, 3b composing the fastener, which is illustrated in FIG. 1B but not in FIGS. 2A to 2D.

The surface on the tire cavity side of the fixing member 7 is preferably formed into a smooth plane to prevent interference with an attached object. To achieve entire formability, workability, stable productivity, and production with superior mechanical properties as well as formability of the anchoring elements (protrusions), it is important that the fixing member 7 is formed by a molding with a resin or a resin composition composed of the blend of a resin and an elastomer, or by a woven fabric or a knitted fabric made of filaments.

In the present technology, the side, provided with the anchoring elements 8, of the fixing member 7 preferably has a surface area within a range of 1.3 to 50 times the surface area of the side not provided with the anchoring elements. Here, the ratio of the "surface area of the side, provided with the anchoring elements 8, of the fixing member 7" to the "surface area of the side not provided with the anchoring elements" is calculated using sections that are not provided with the fastener and have the same apparent area, on both side of the fixing member for the measurement. The surface area of the side, provided with the anchoring elements 8, of the fixing member 7 is more preferably within a range of 1.5 to 40 times the surface area of the side not provided with the anchoring elements.

The apparent area of the fixing member is preferably 20 to 500 times the projected area of the fastener. This is because more anchoring elements are disposed on the fixing member having a larger apparent area and the entire anchor effect can thus be produced more greatly and stably. Herein, the "apparent area of the fixing member" refers to an area inside the profile shape of the fixing member viewed in the vertical direction, which is a projected area including the areas of the fastener and the hole 10. The "projected area of the fastener" refers to a projected area (except the hole 10) in a state where the components 3a, 3b composing the fastener 3 are integrated to form the fastener 3. The lower limit, 20 times, of the range of the apparent area of the fixing member corresponds to the mass of an attached object (equivalent to the size of the fastener). If the apparent area is less than 20 times, it is difficult to yield sufficient fixing strength. As for the upper limit, if the apparent area is more than 500 times, the fixing member has an excessively large area and cannot thus cope with deformation of the tire, causing the durability to decline.

Therefore, both the cases are not preferable.

Preferably, the height H (mm) of the anchoring elements, the number A (pieces/fastener) of anchoring elements per fastener, and the mass G (g) of an object attached via the fastener satisfy the following Formula (a) from the perspective of ensuring great anchor effect of the anchoring elements:

(Height $H$ of anchoring elements×Number $A$ of elements)/Mass $G$ of attached object=2 to 75   Formula (a).

The height H (mm) of the anchoring elements is preferably 0.3 to 5.0 mm, and the number A (pieces/fastener) of anchoring elements per fastener is preferably 500 to 5000 (pieces/fastener). The mass G (g) of an object 11 attached via the fastener is determined by the type, structure, and the like of the object depending on the desired function; however, the preferable mass G is generally 50 to 200 (g). The value of the above Formula (a) is preferably 4 to 50.

Figure 4:
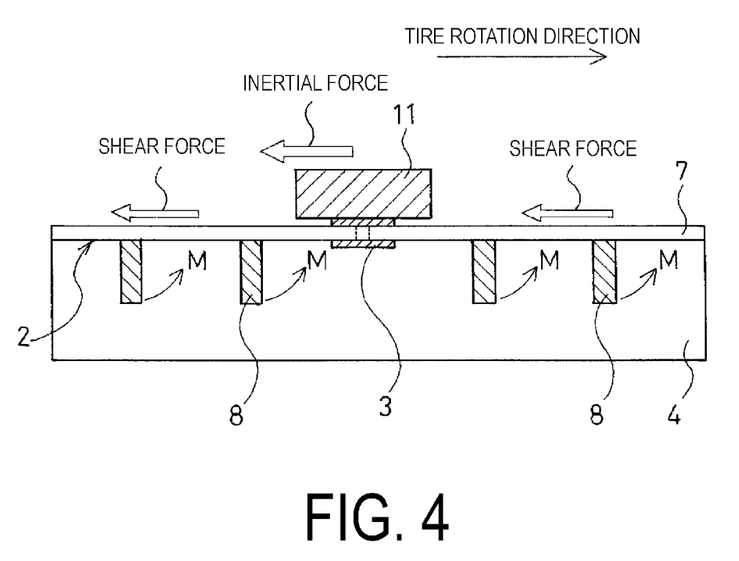
FIG. 4 is a model diagram illustrating advantageous effects achieved by the present technology with the configuration in which the anchoring elements are provided on a tire inner surface side of the fixing member and the anchoring elements are embedded in the tire inner surface.

In the present technology, the anchoring elements 8 embedded in the tire inner surface 2 achieve advantageous effects. With reference to the model view in FIG. 4, as the tire rotates, the object 11 attached to the tire inner surface 2 receives inertial force in a direction opposite to the accelerating or decelerating direction of the tire rotation, and the fixing member 7 disposed on the tire inner surface 2 receives force in the same direction as that of the inertial force and thus receives shear force that may remove the fixing member 7 together with the attached object 11 from the tire inner surface 2. In the present technology, the fixing member 7 includes a large number of anchoring elements 8 disposed on the side facing the tire inner surface 2, and the anchoring elements are at least partially embedded in the tire inner surface. This configuration enables a rotating moment M having a vector in a direction opposite to that of the shear force to be applied to each of the anchoring elements 8.

Accordingly, the shear force and the rotating moment are balanced against each other, and the shear force applied to the fixing member 7 is thus alleviated, such that the attached object 11 having a desired function can be attached in the tire cavity and retained over an extended period of time.

Figure 5A:
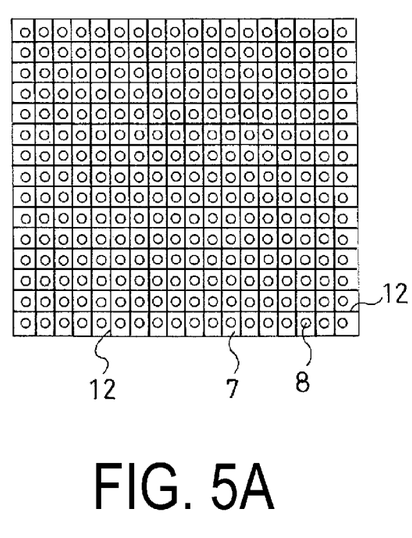
FIGS. 5A to 5C are model diagrams illustrating preferred example aspects, of the fixing member used in the present technology, in which reinforcing filaments are disposed between the anchoring elements on the side, facing the tire inner surface, of the fixing member.
Figure 5B:
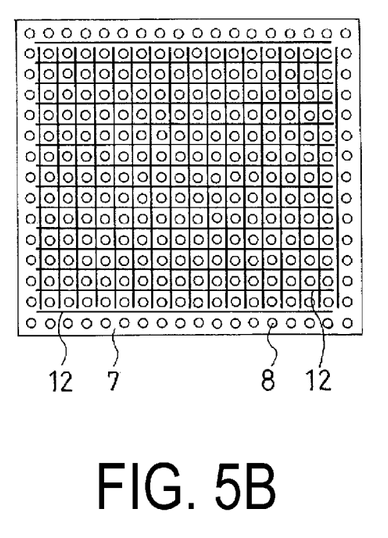
Figure 5C:
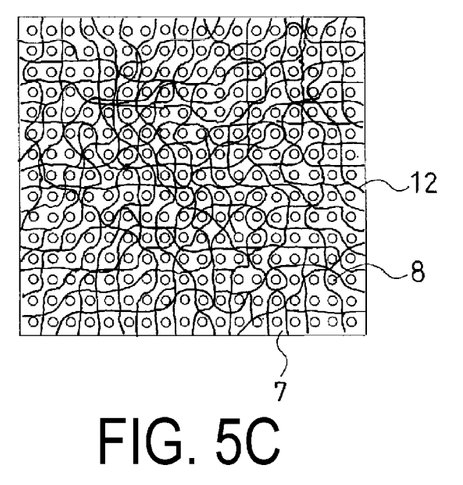

In the present technology, to increase the fixing strength of the fixing member 7, reinforcing filaments 12 are preferably arranged between the anchoring elements 8 on the side, facing the tire inner surface, of the fixing member 7 as illustrated in FIGS. 5A to 5C. FIGS. 5A to 5C illustrate example aspects of the above configuration. In the examples in FIGS. 5A, 5B, the reinforcing filaments 12 are arranged into lattice patterns. The difference between FIG. 5A and FIG. 5B is that the reinforcing filaments 12 are arranged between the anchoring elements positioned outermost in FIG. 5A but not in FIG. 5B. The reinforcing filaments are not necessarily arranged uniformly. FIG. 5C illustrates an example of the reinforcing filaments arranged randomly. The reinforcing filaments are preferably arranged by laminating, on the fixing member, a woven fabric obtained by weaving reinforcing filaments with the same intervals as those of the arranged anchoring elements or a woven fabric or a knitted fabric obtained by knitting in the same way. A woven fabric has the advantage of good dimensional stability, and a knitted fabric has the advantage of some stretchability. Such fabrics are desirably arranged in consideration of those advantages.

A thicker base section of the fixing member may cause a crack at low temperatures; however, the reinforcing filaments arranged in the fixing member prevent such a crack. The components 3$a$, 3$b$ are disposed while sandwiching the fixing member and the reinforcing filaments.

Figure 6:
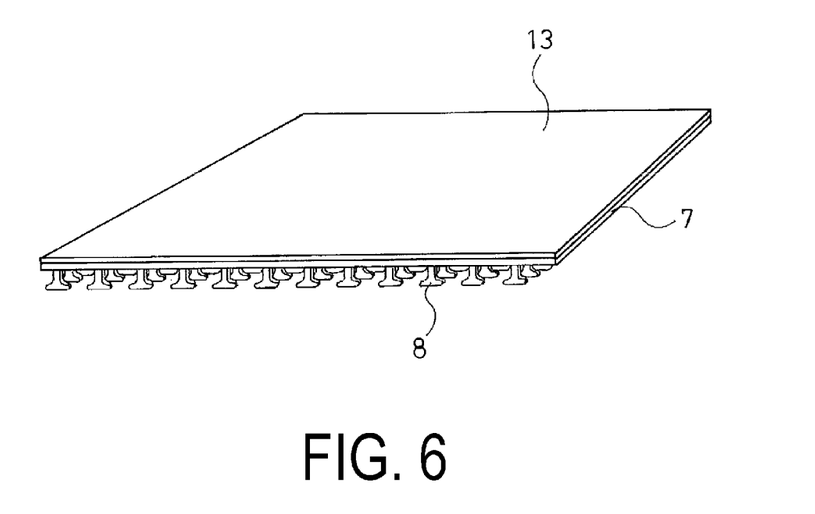
FIG. 6 is a model diagram illustrating another preferred example aspect, of the fixing member used in the present technology, in which the base section of the fixing member is composed of a laminated structure of two types of resin layers or a laminated structure of a resin layer and a layer other than a resin layer.

With reference to FIG. 6, the base section of the fixing member 7 is preferably composed of a laminated structure of two types of resin layers or a laminated structure of a resin layer and a layer other than a resin layer. In FIG. 6, reference number 13 indicates a layer additionally laminated on the basic structure of the fixing member used in the present technology illustrated in FIGS. 2A to 3B. A film layer or the like that can cope with bending deformation and has high tensile strength is especially preferable as the additionally laminated layer. Alternatively, laminating a metal sheet, such as aluminum foil, is also preferable from the perspective of preventing deterioration due to ultraviolet rays during storage before fitting to a rim. Furthermore, a laminated structure may be formed through vapor deposition or adhesion of a metal, such as aluminum, to a resin layer.

To enhance adhesiveness and bondability, corona treatment or plasma treatment may be performed on the surfaces of the anchoring elements on the side, facing the tire, of the fixing member. This is especially preferable if the fixing member has the base section formed into a flat film sheet, because enhancement in adhesiveness and bondability is effective.

The fixing member is disposed on the tire inner surface in such a manner that the fixing member having the anchoring elements and sandwiched by the two fasteners is arranged, by adhesion, compression bonding, or the like, on the inner surface of a green tire before vulcanization molding. At this time, the fixing member is fixed such that the anchoring elements are at least partially embedded in the inner surface of the green tire. The tire is subjected to vulcanization in that state, such that a pneumatic tire according to the present technology in which the fixing member is fixed by vulcanization bonding can be produced.

EXAMPLES

Example 1, Comparative Example 1

Two types of pneumatic tires (2700R49) were produced. One (Example 1) had the fixing member, for the mechanical fastener, having the anchoring elements according to the present technology, and the other (Comparative Example 1) had the fixing member not having the anchoring elements.

The fixing member of Example 1 had the anchoring elements having the form illustrated in FIG. 2D (the height of the anchoring elements=3.0 mm, the number of anchoring elements=3000 pieces/fastener, the apparent area of the fixing member=5500 mm$^2$, the projected area of the fastener=78.6 mm$^2$, the apparent area of the fixing member=70 times the projected area of the fastener), and the entire shape of the fixing member was circular. The surface area of the side, provided with the anchoring elements, of the fixing member was 44000 mm$^2$, the surface area of the side not provided with the anchoring elements was 5420 mm$^2$, and the surface area of the side, provided with the anchoring elements, of the fixing member was 8 times the surface area of the side not provided with the anchoring elements.

As an object having a specific function, a transmitter-integrated air pressure sensor was attached using the mechanical fastener. The transmitter-integrated air pressure sensor had a mass of 150 g and its entire shape was substantially cuboid. A fastener on the object side composing a pair of mechanical fasteners together with the fastener on the pneumatic tire side was provided on the bottom surface of the transmitter-integrated air pressure sensor. The value of (Height (mm) of anchoring elements×Number of anchoring elements (pieces/fastener))/Mass (g) of attached object is 11.

The test tires were tested by running the tires continuously for a total of 120 hours at a running speed of 25 kmph (tire air pressure of 800 kPa and applied load of 350 kN). After the test running, the test tires were checked for removal of the fixing member. The tire of Example 1 did not generate the removal and was not deformed or damaged. The tire of Comparative Example 1 generated the removal.

It was determined that data measured and collected by the transmitter-integrated air pressure sensor attached to the tire of Example 1 was stable, and highly accurate and reliable. In Comparative Example 1, it was determined that data was accurate, stable, and reliable enough not to cause a problem but was slightly less stable than in Example 1.

The invention claimed is:

1. A pneumatic tire comprising:
one fastener in a separable pair of mechanical fasteners, the one fastener being disposed on a tire inner surface;
the one fastener comprising at least two components;
the at least two components being fixed together while sandwiching a fixing member made from a resin or a resin composition composed of a blend of a resin and an elastomer;
the fixing member comprising anchoring elements disposed only on a side facing the tire inner surface; and
the anchoring elements being at least partially embedded in the tire inner surface.

2. The pneumatic tire according to claim 1, wherein the side, provided with the anchoring elements, of the fixing member has a surface area within a range of 1.3 to 50 times a surface area of a side not provided with the anchoring elements.

3. The pneumatic tire according to claim 1, wherein an apparent area of the fixing member is 20 to 500 times a projected area of the one fastener.

4. The pneumatic tire according to claim 1, wherein a height (mm) of the anchoring elements, a number (pieces/fastener) of the anchoring elements per fastener, and a mass (g) of an object attached via the one fastener satisfy the following Formula (a):

$$\text{(Height of anchoring elements} \times \text{Number of anchoring elements)/Mass of attached object} = 2 \text{ to } 75 \qquad \text{Formula (a).}$$

5. The pneumatic tire according to claim 1,
wherein reinforcing filaments are arranged between the anchoring elements on the side, facing the tire, of the fixing member; and
the one fastener is disposed while sandwiching the fixing member and the reinforcing filaments.

6. The pneumatic tire according to claim 1, wherein the fixing member is composed of two types of resin layers or a resin layer laminated on a layer other than a resin layer.

7. The pneumatic tire according to claim 1, wherein corona treatment or plasma treatment is performed on surfaces of the anchoring elements on the side, facing the tire, of the fixing member.

8. The pneumatic tire according to claim 2, wherein an apparent area of the fixing member is 20 to 500 times a projected area of the one fastener.

9. The pneumatic tire according to claim 8, wherein a height (mm) of the anchoring elements, a number (pieces/fastener) of the anchoring elements per fastener, and a mass (g) of an object attached via the one fastener satisfy the following Formula (a):

$$\text{(Height of anchoring elements} \times \text{Number of anchoring elements)/Mass of attached object} = 2 \text{ to } 75 \qquad \text{Formula (a).}$$

10. The pneumatic tire according to claim 9,
wherein reinforcing filaments are arranged between the anchoring elements on the side, facing the tire, of the fixing member; and
the one fastener is disposed while sandwiching the fixing member and the reinforcing filaments.

11. The pneumatic tire according to claim 10, wherein the fixing member is composed of two types of resin layers or a resin layer laminated on a layer other than a resin layer.

12. The pneumatic tire according to claim 11, wherein corona treatment or plasma treatment is performed on surfaces of the anchoring elements on the side, facing the tire, of the fixing member.

* * * * *